US007320136B1

(12) United States Patent
Yu (10) Patent No.: US 7,320,136 B1
(45) Date of Patent: Jan. 15, 2008

(54) APPARATUS FOR CONNECTING TV AND COMPUTER

(75) Inventor: Won-Uk Yu, Dacku (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 09/706,792

(22) Filed: Nov. 7, 2000

(30) Foreign Application Priority Data

Nov. 8, 1999 (KR) .................................. 1999-49266

(51) Int. Cl.
*H04N 7/18* (2006.01)
*H04N 11/00* (2006.01)
*H04N 5/44* (2006.01)

(52) U.S. Cl. .......................... 725/89; 348/552; 348/553
(58) Field of Classification Search ................... 725/74, 725/80; 348/552–553
See application file for complete search history.

(56) References Cited

U.S. PATENT DOCUMENTS

| 5,850,340 | A  | * | 12/1998 | York ............................. 700/83 |
| 6,084,638 | A  | * | 7/2000  | Hare et al. ................... 348/552 |
| 6,189,148 | B1 | * | 2/2001  | Clark et al. ................... 725/78 |
| 6,219,839 | B1 | * | 4/2001  | Sampsell ...................... 725/40 |
| 6,239,845 | B1 | * | 5/2001  | Itagaki et al. ............... 348/552 |
| 6,567,032 | B1 | * | 5/2003  | Mullaly et al. .............. 341/176 |

FOREIGN PATENT DOCUMENTS

| GB | 2 330 722 A | 4/1999 |
| JP | 08/278773   | 10/1996 |
| JP | 10-040190   | 2/1998 |
| JP | 10-116145   | 5/1998 |
| JP | 10-145796   | 5/1998 |
| JP | 10-224701   | 8/1998 |
| JP | 11-275481   | 10/1999 |
| WO | WO 98/16065 | 4/1998 |
| WO | WO 98/34377 | 8/1998 |
| WO | WO 98/39766 | 9/1998 |

* cited by examiner

Primary Examiner—Hunter B. Lonsberry
(74) Attorney, Agent, or Firm—Ked & Associates, LLP (57) ABSTRACT

An apparatus for connecting a computer and a TV is disclosed. The apparatus according to the present invention includes a TV coding unit for encoding various control signals such as a TV signal, etc. generated in a TV and generating a first packet signal, a computer coding unit for encoding a computer signal such as a video signal, audio signal and various control signals generated in a computer and generating a second packet signal, a TV transmission and receiving unit for receiving the first packet signal, transmitting the received first packet signal to the outside and receiving the second packet signal from the outside, a computer transmission and receiving unit for receiving the second packet signal, transmitting the received second packet signal to the outside and receiving the first packet signal from the outside, a TV decoding unit for receiving the second packet signal from the TV transmission and receiving unit, decoding the same and recovering into an original signal, a computer decoding unit for receiving the first packet signal from the computer transmission and receiving unit, decoding the received first packet signal and recovering into an original signal, and a transmission line connected between the TV transmission and receiving unit and the computer transmission and receiving unit for transmitting the first packet signal and the second packet signal.

9 Claims, 6 Drawing Sheets

COMPUTER

COMPUTER

TRANSMISSION LINE

APPARATUS FOR CONNECTING TV AND COMPUTER

BACKGROUND OF THE INVENTION

1. Field of the Invention

The present invention relates to an apparatus for connecting a TV and a computer.

2. Description of the Background Art

Figure 1:
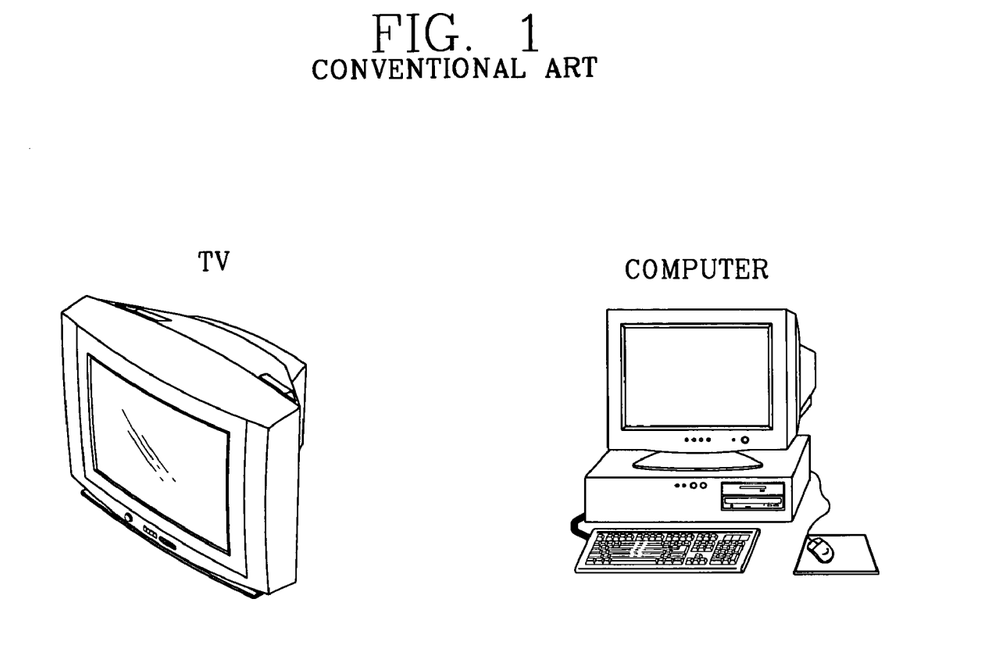
FIG. 1 is a view illustrating an example that a computer and a TV are separately used in a certain home.
Figure 2:
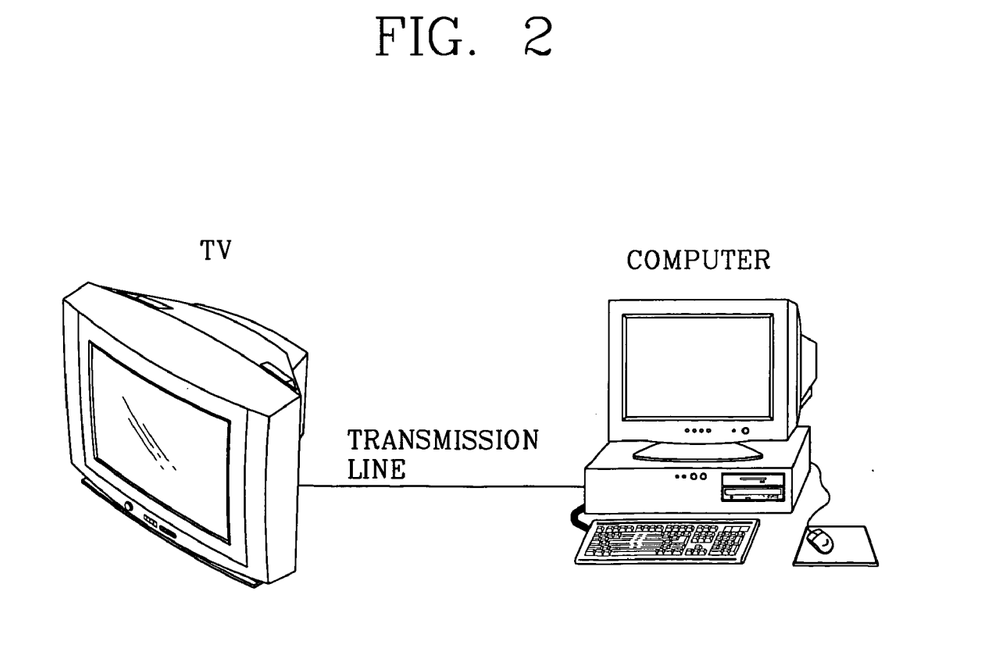
FIG. 2 is a schematic view illustrating a structure for connecting a TV and a computer.

FIG. 1 is a view illustrating a state that a TV and a computer are separately used.

The TV is generally placed on a floor of a certain room so that a viewer can view a certain broadcast program, and a computer is installed in a certain room separately from the TV. A certain number of software programs are installed in the computer.

As the society is advanced, there is a need for providing various functions such as an internet browsing function, a bi-directional broadcasting function, etc. to the TV compared to the conventional TV which is used for just viewing a simple broadcast program. Recently, the TV has a function similar to the function of the computer. In addition, the computer has an advanced multi-media function, so that the functions of the computer and TV are overlapped in a digital video image, a video conference system, etc.

In the conventional art, the TV and computer are separately used. A certain interactive function and a data communication are not effectively performed between the TV and computer. When a certain interactive control function is provided between the TV and the computer for transmitting and receiving data, it is possible to more effectively use the TV and computer.

SUMMARY OF THE INVENTION

Accordingly, it is an object of the present invention to provide an apparatus for connecting a TV and a computer which is capable of more effectively using a TV and a computer by controlling a computer at the side of a TV by connecting the TV and computer and transmitting a certain data between the computer and TV.

In the present invention, a transmission line capable of inputting and outputting a control signal, video signal and audio signal is connected between a TV and a computer.

To achieve the above object, there is provided an apparatus for connecting a computer and a TV which includes a TV coding unit for encoding various control signals such as a TV signal, etc. generated in a TV and generating a first packet signal, a computer coding unit for encoding a computer signal such as a video signal, audio signal and various control signals generated in a computer and generating a second packet signal, a TV transmission and receiving unit for receiving the first packet signal, transmitting the received first packet signal to the outside and receiving the second packet signal from the outside, a computer transmission and receiving unit for receiving the second packet signal, transmitting the received second packet signal to the outside and receiving the first packet signal from the outside, a TV decoding unit for receiving the second packet signal from the TV transmission and receiving unit, decoding the same and recovering into an original signal, a computer decoding unit for receiving the first packet signal from the computer transmission and receiving unit, decoding the received first packet signal and recovering into an original signal, and a transmission line connected between the TV transmission and receiving unit and the computer transmission and receiving unit for transmitting the first packet signal and the second packet signal.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 3A:
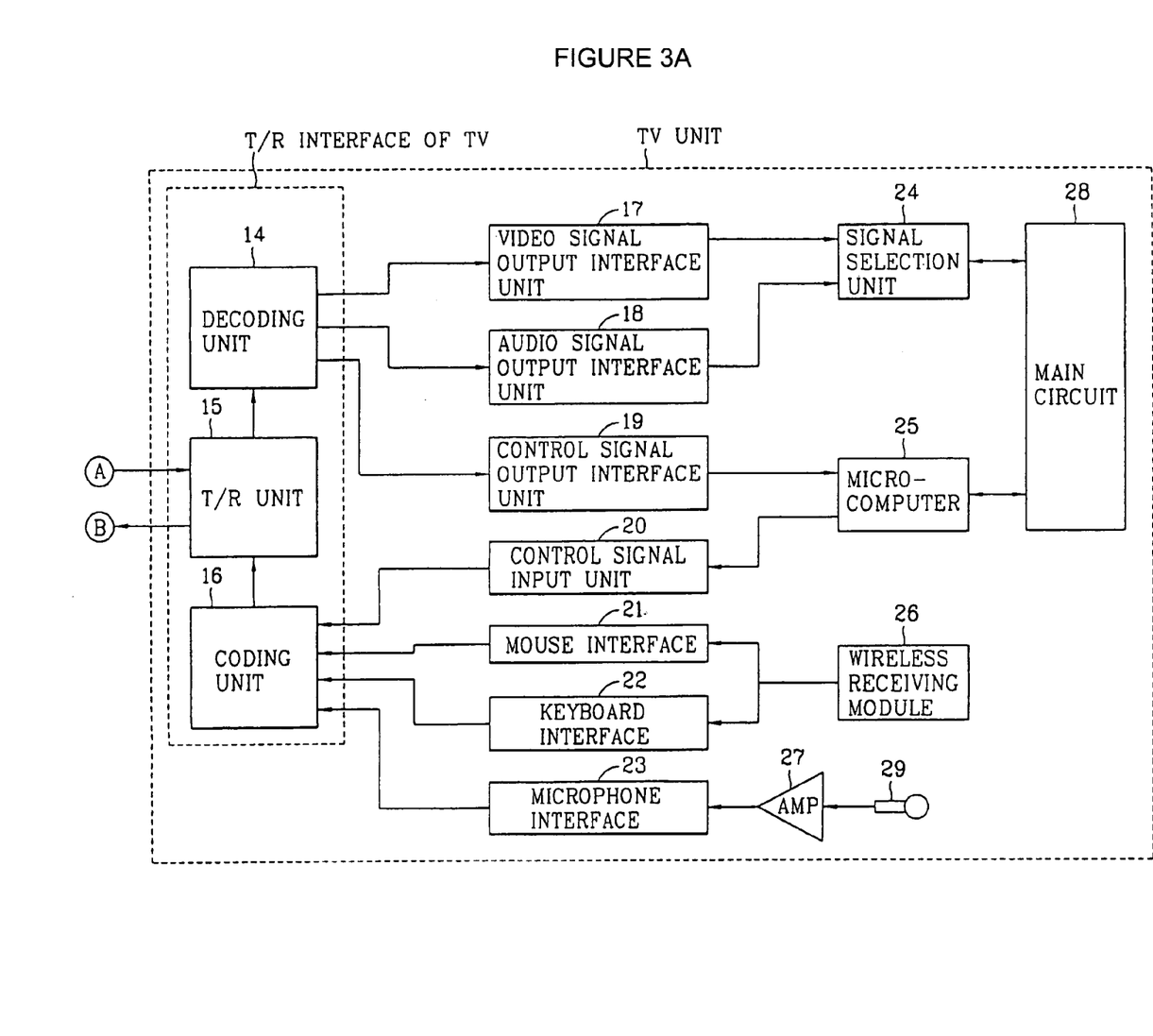
FIGS. 3A and 3B (hereafter collectively referred to as FIG. 3) illustrate elements according to the present invention.
Figure 3B:
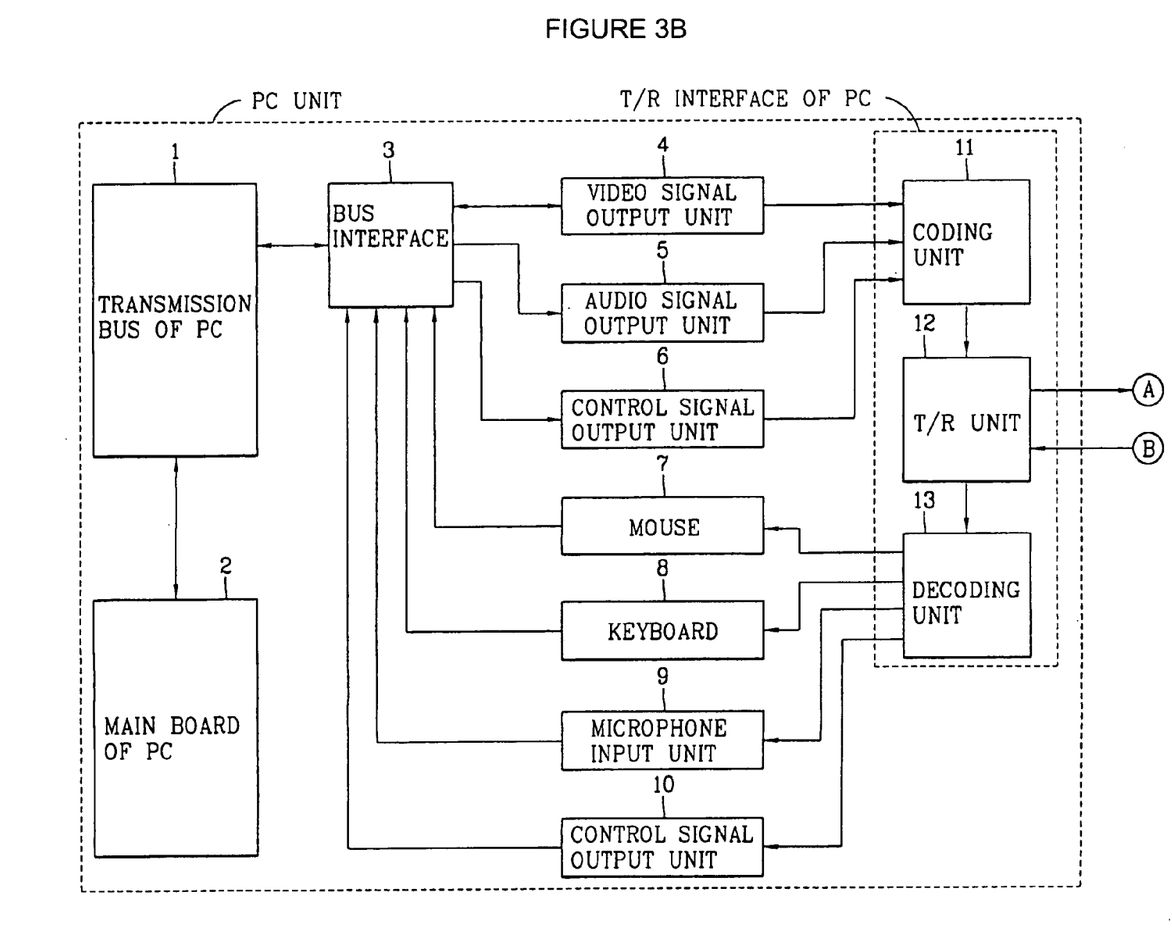

FIG. 3 is a block diagram of elements of the present invention which includes a TV system and a computer system.

The TV system includes a TV coding unit 16 for encoding various signals such as an input signal of a mouse, keyboard, microphone, etc. and a control signal, a TV transmission and receiving unit 15 for transmitting a first packet signal encoded by the TV coding unit 16 to the outside and receiving a second packet signal such as a video signal, an audio signal and a control from the outside, a TV decoding unit 14 for decoding a second packet signal from the TV transmission and receiving unit 15, a video signal interface unit 17 for receiving a video signal from the TV decoding unit 14, an audio signal output interface unit 18 for receiving an audio signal from the TV decoding unit 14, a control signal output interface unit 19 for receiving a control signal from the TV decoding unit 14, a control signal input interface unit 20 for outputting a control signal to the TV coding unit 16, a wireless receiving module 26 for receiving a wireless signal, a wireless mouse interface unit 21 for receiving a signal from the wireless receiving module 26 and outputting a wireless mouse signal to the TV coding unit 16, a wireless keyboard interface unit 22 for receiving a signal from the wireless receiving module 26 and outputting a wireless keyboard signal to the TV coding unit 16, an amplifier 27 for amplifying a signal from the microphone 29, a microphone interface unit 23 for receiving a signal from the amplifier 27 and outputting a microphone signal, an AV switch 24 for receiving signals from the video signal output interface unit 17 and the audio signal output interface unit 18 and switching the receiving signals, a TV microcomputer for controlling elements of the TV and a TV main unit 28.

Next, the computer system includes a computer decoding unit 13 for decoding various signals such as an input signal of a mouse, a keyboard, and a microphone and a control signal, a computer coding unit 11 for encoding a video signal, an audio signal and control signal, a computer transmission and receiving unit 12 for transmitting a second packet signal encoded by the computer coding unit 11 to the outside and receiving a first packet signal such as an input signal of a mouse, keyboard and microphone and a control signal, a video signal output unit 4 for outputting a video signal to the computer coding unit 11, an audio signal output unit 5 for outputting an audio signal to the computer coding unit 11, a control signal output unit 6 for outputting a control signal to the computer coding unit 11, a mouse 7 for receiving a mouse signal from the computer decoding unit 13, a keyboard 8 for receiving a keyboard signal from the computer decoding unit 13, a microphone input unit 9 for receiving a microphone input signal from the computer decoding unit 13, a control signal output unit 10 for receiving a control signal from the computer decoding unit 13, a main board 2 of the computer, a transmission bus 1 of the computer, and a bus interface unit 3 for interfacing each element of the computer.

The operation and effects of the present invention will be explained with reference to FIGS. 3, 4 and 5.

First, the TV coding unit 16 encodes a TV signal such as various control signals generated in the TV and generates a first packet signal. A chrome signal and control signal generated by the TV main circuit 28 are selected by the TV microcomputer 25 and are applied to the TV coding unit 16 through the control input interface unit 20.

The above-described various control signals applied to the TV coding unit 16 include a microphone signal inputted through the microphone 29 connected with the TV, the amplifier 27 connected with the microphone 29, and the microphone interface unit 23, and a wireless mouse signal and a wireless keyboard signal inputted from the wireless mouse interface unit 21 and the wireless keyboard interface unit 22 through the wireless receiving module 26.

The computer coding unit 11 encodes a video and audio signal generated in the computer and various control signals and generates a second packet signal. Various signals generated by the main board 2 of the computer are applied to the computer coding unit 11 through the transmission bus 1 and the bus interface unit 3 of the computer and the video output unit 4, the audio output unit 5 and the control signal output unit 6.

The TV transmission and receiving unit 15 outputs the first packet signal generated by the TV coding unit 16 to the outside and receives a second packet signal generated by the computer coding unit 11. In addition, the computer transmission and receiving unit 12 transmits the second packet signal generated by the computer coding unit to the outside and receives the first packet signal generated by the TV coding unit 16.

At this time, the computer coding unit 11 is installed in the computer, and the TV coding unit 16 is installed in the TV. Therefore, an additional transmission line which connects the TV transmission and receiving unit 15 and the computer transmission and receiving unit 12 is needed so that the TV transmission and receiving unit 15 and the computer transmission and receiving unit 12 transmit and receive the first packet signal and the second packet signal.

Figure 4:
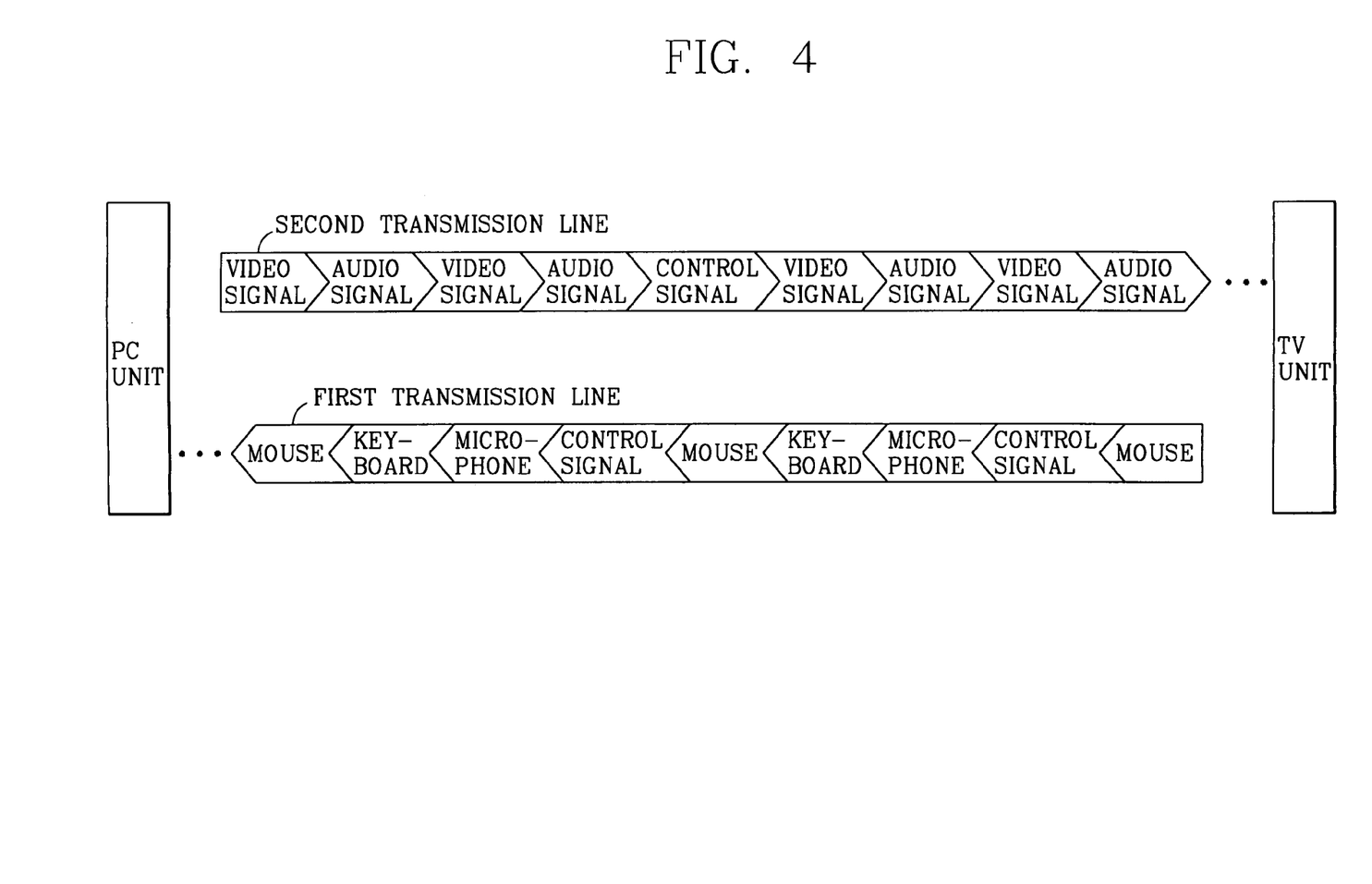
FIG. 4 is a view illustrating a structure of a transmission line and a packet signal transmitted through the transmission line according to the present invention.

FIG. 4 illustrates a transmission line structure according to the present invention and a packet signal transmitted through the transmission line.

The transmission line may be implemented based on a physical line or a wireless type between the TV transmission and receiving unit 15 and the computer transmission and receiving unit 12 for transmitting and receiving the first and second packet signals. The physical transmission line includes a first transmission line for transmitting a first packet signal from the TV transmission and receiving unit 15 to the computer transmission and receiving unit 12, and a second transmission line for transmitting a second packet signal from the computer transmission and receiving unit 12 to the TV transmission and receiving unit 15.

The first packet signal that the mouse signal, keyboard signal, microphone signal and control signal are encoded in the TV is transmitted through the first transmission line, and the second packet signal that the video signal, audio signal and control signal are encoded in the computer is transmitted through the second transmission line.

The TV decoding unit 14 decodes the second packet signal transmitted from the computer transmission and receiving unit 12 through the second transmission line and recovers to an original signal. Therefore, the second packet signal is recovered into a video signal, audio signal and various control signals by the TV decoding unit 14. The thusly recovered signals are applied to the video signal output interface unit 17, the audio signal output interface unit 18, and the control signal output interface unit 19, respectively.

The computer decoding unit 13 decodes the first packet signal transmitted from the TV transmission and receiving unit 15 through the first transmission line and recovers into an original signal. Therefore, the first packet signal is recovered by the computer decoding unit 13 into a control signal outputted from the TV. The above-described signal includes various signals for controlling the operation of the computer, a microphone signal, a wireless keyboard signal, a wireless mouse signal, etc.

The TV connected with the computer by the connection apparatus according to the present invention includes a TC coding unit 16 and a TV decoding unit 14, a TV transmission and receiving unit 15, and a signal selection unit 24 for selecting the signal recovered by the TV decoding unit 14 and a current broadcast video signal. The signal selection unit 24 selects a signal among the current broadcast TV video signal and the TV audio signal and inputs the selected signal into the TV main circuit 28. Therefore, the TV can selectively displays a video signal and a broadcast signal of the computer using the signal selection unit 24, and the audio signal and broadcast signal of the computer are selectively outputted to the speaker. In addition, the TV microcomputer 25 applies a TV control signal to the control input interface and receives a computer control signal recovered by the TV decoding unit 14 through the control output interface and applies to the TV main circuit.

The computer connected with the TV by the connection apparatus according to the present invention includes a computer coding unit 11 and a computer decoding unit 13, a computer transmission and receiving unit 12, and a bus interface unit 3 and various input interfaces for applying a signal recovered by the computer decoding unit 13 to the main board 2 of the computer. Various input interface units include a mouse input unit 7, a keyboard input unit 9, a control signal input unit 10, etc. for thereby inputting various control signals generated in the TV to the main board 2 of the computer.

The operation of the connection apparatus according to the present invention will be explained with reference to the accompanying drawings.

The video signal and audio signal generated by the main circuit 28 of the TV are controlled by the TV microcomputer 25, and the TV control signal is applied to the TV coding unit 16 through the control signal input interface unit 20 and is encoded thereby. In addition, the microphone signal generated by the microphone 29 which is separately installed in the TV is amplified by the amplifier 27 and is applied to the TV coding unit 16 through the microphone interface unit 23 and is encoded thereby. The mouse signal and keyboard signal inputted through the wireless receiving module 26 are applied to the TV coding unit 16 through the mouse interface unit 21 and the keyboard interface unit 22. In addition, the first packet signal encoded by the TV coding unit 16 is applied to the TV transmission and receiving unit 15 and is transmitted to the computer transmission and receiving unit 12 through the transmission line.

The first packet signal transmitted to the computer transmission and receiving unit 12 is applied to the computer decoding unit 13 and is recovered to an original signal. Namely, the first packet signal is recovered into a TV control signal, a mouse control signal, a keyboard signal and a microphone signal by the computer decoding unit 13, respectively. The signals recovered by the computer decoding unit 13 are applied to various bus interface units 3 and are inputted into the main board of the computer through the transmission bus 1 of the computer. As a result, the user controls the computer by operating the TV.

In addition, the video signal, audio signal and various control signals are inputted into the video output unit 4, the audio output unit 5 and the control signal output unit through the transmission bus 1 of the computer and the bus interface unit 3. The video signal and audio signal inputted into each output unit are encoded into a second packet signal by the computer coding unit 11, respectively, and are transmitted to the TV transmission and receiving unit 15 through the transmission line.

The sizes of the first packet signal and second packet signal may be decreased or increased based on the transmission amount of the data.

The second packet transmission signal transmitted to the TV transmission and receiving unit 15 are applied to the TV decoding unit 14 and are recovered into an original computer video signal, audio signal and control signal. The computer video signal recovered by the TV decoding unit 14 is applied to the signal selection unit 24 of the TV through the video signal output interface unit. One of the computer video signal and the TV video signal is selected by the signal selection unit 24 and is inputted into the main circuit 28 of the TV. Therefore, the video signal of the computer is displayed on the screen of the TV by the operation of the signal selection unit 24.

In addition, the computer audio signal recovered by the TV decoding unit 14 is applied to the TV signal selection unit 24 through the audio signal output interface unit. One of the computer audio signal and TV audio signal is selected by the signal selection unit 24 and is inputted into the main circuit 28 of the TV. Therefore, the audio signal of the computer is outputted through the computer speaker based on the operation of the signal selection unit 24.

The computer control signal recovered by the TV decoding unit 14 is applied to the microcomputer of the TV through the control signal output interface unit 19. The microcomputer which receives the computer control signal controls the main circuit 28 of the TV, so that the video and audio-based operation is implemented by the computer.

Therefore, it is possible to output a video and audio signals of the computer by operating the screen and speaker of the TV based on a user's computer operation.

Figure 5A:
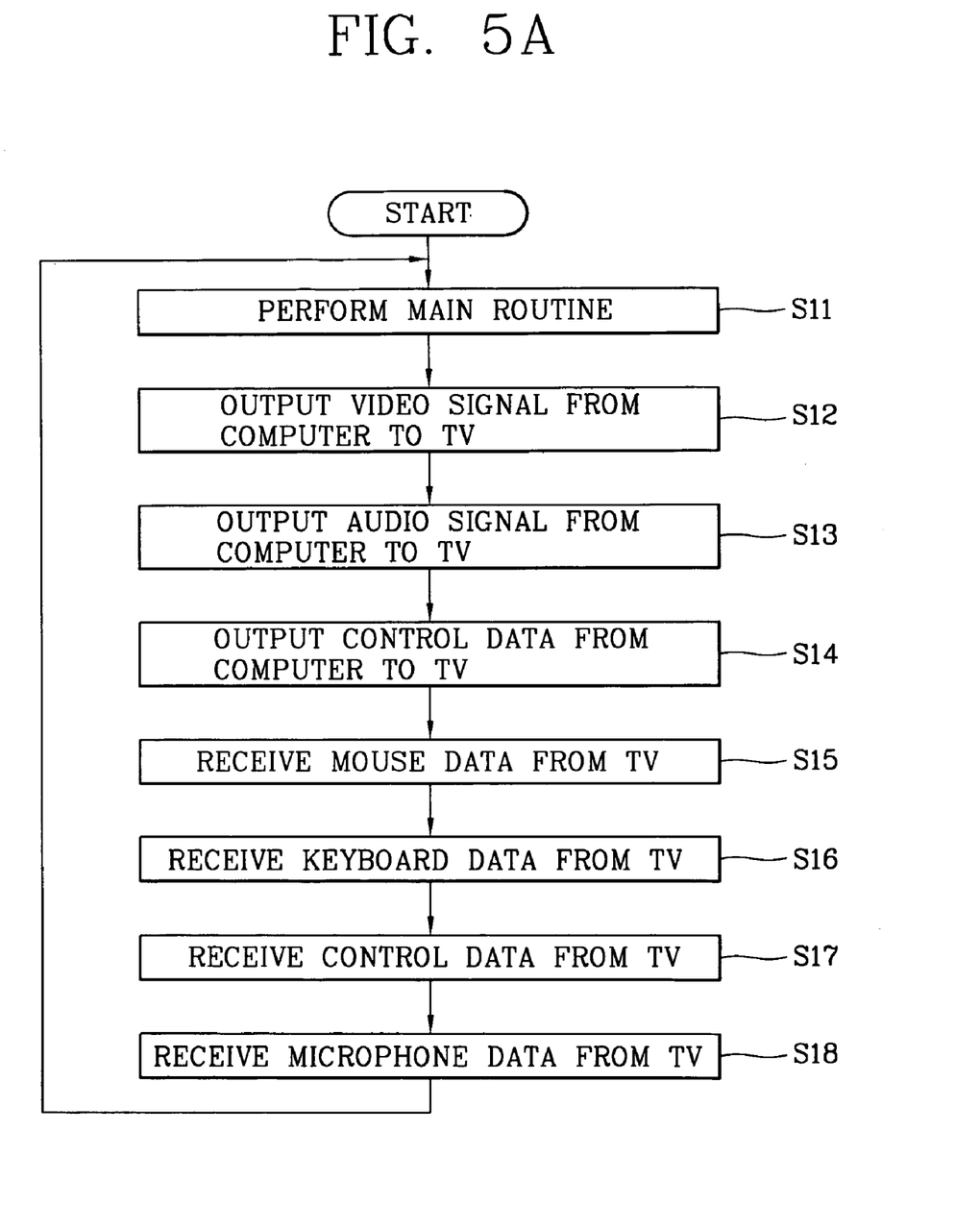
FIG. 5A is a flow chart illustrating an operation of a computer according to the present invention.
Figure 5B:
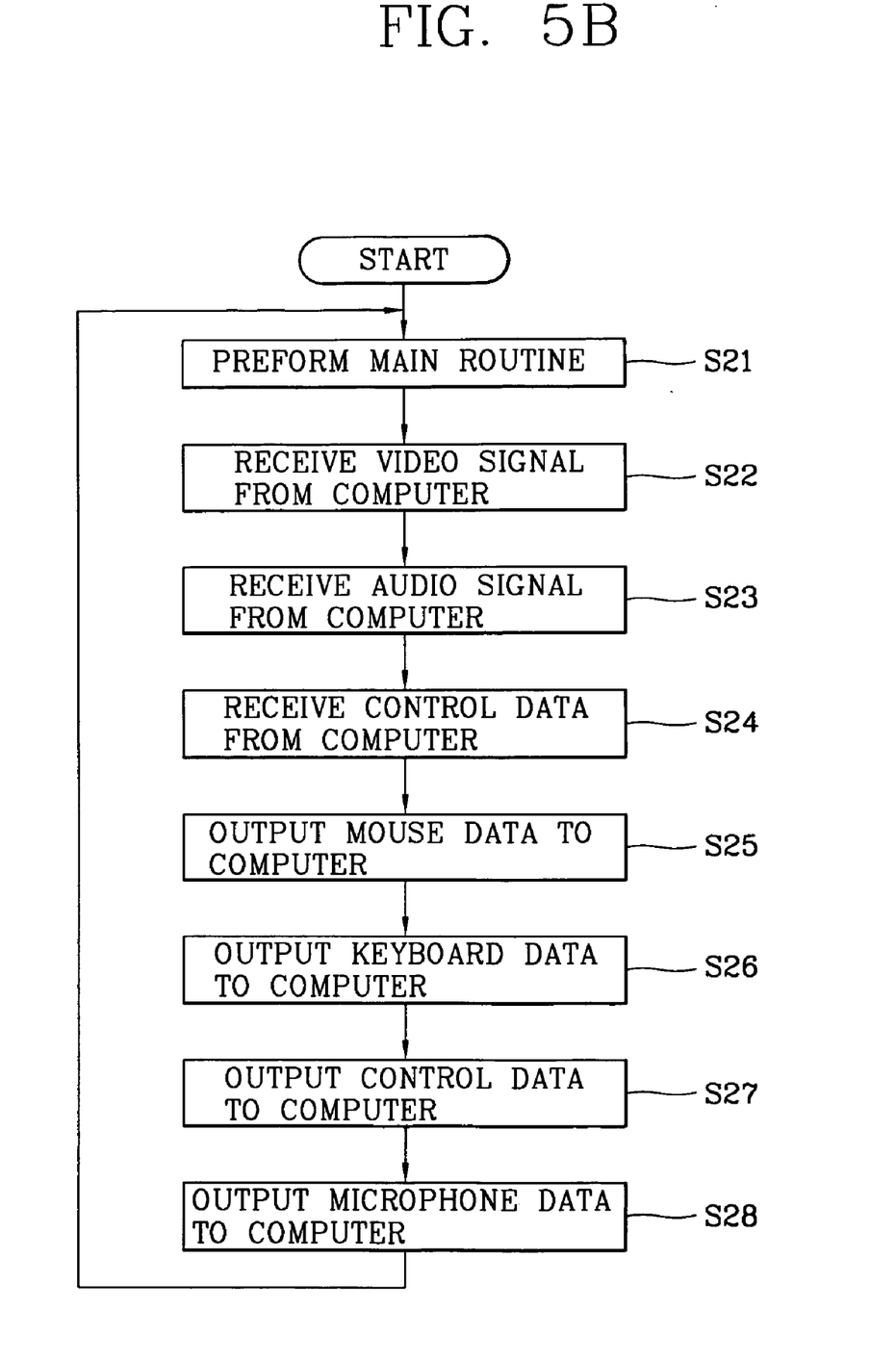
FIG. 5B is a flow chart illustrating an operation of a TV according to the present invention.

FIG. 5A is a flow chart of the operation of the computer according to the present invention, and FIG. 5B is a flow chart of the operation of the TV according to the present invention.

In the computer according to the present invention, a conventional computer work routine is performed in Step S11, and the video signal, audio signal and control signal of the computer are outputted to the TV in Steps S12, S13 and S14. The mouse signal, keyboard signal, various control signals and microphone signal transmitted from the TV are received in Steps S15, S16, S17 and S18. The computer work routine is repeatedly performed based on the above-described signals.

In the TV according to the present invention, a conventional TV work routine is performed in Step S21, and the video signal, audio signal and control signal transmitted from the computer are received in Steps S22, S23 and S24, and then the video signal and audio signal of the computer are outputted, and the TV work routine is repeatedly performed based on the received signals. In addition, the mouse signal and keyboard signal which control the computer and various control signals and microphone signal are outputted to the computer in Step S25, S26, S27 and S28.

Therefore, a user who uses the TV and computer according to the present invention is capable of controlling the computer through the TV and is capable of implementing computer video and audio signals on the TV by operating the computer.

Namely, in the connection apparatus according to the present invention, since the computer and TV which are separately used in the conventional art are connected by a transmission line, it is possible to integrally control the computer and TV. Therefore, the connection apparatus according to the present invention is capable of effectively connecting the computer and TV compared to the conventional art.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for connecting a TV (Television Set) and a computer, comprising:

a TV coding unit for encoding control signals including at least one of a mouse signal, a keyboard signal, a microphone signal and control signals for controlling a computer, which are generated in a TV and generating a first packet signal by using the encoded control signals;

a computer coding unit for encoding computer signals including at least one of a video signal, an audio signal and a control signal generated in the computer and generating a second packet signal by using the encoded computer signals;

a TV transmission and receiving unit, provided in the TV, for receiving the first packet signal from the TV coding unit, transmitting the received first packet signal to the computer and receiving the second packet signal from the computer;

a computer transmission and receiving unit, provided in the computer, for receiving the second packet signal from the computer coding unit, transmitting the received second packet signal to the TV and receiving the first packet signal from the TV;

a TV decoding unit, provided in the TV, for receiving the second packet signal from the TV transmission and receiving unit, decoding the received second packet signal and recovering the decoded second packet signal into the video signal, the audio signal and the control signal of the computer;

a computer decoding unit for receiving the first packet signal from the computer transmission and receiving unit, decoding the received first packet signal and recovering the decoded first packet signal into the mouse signal, the keyboard signal, the microphone signal and the control signals for controlling the computer; and a transmission line connected between the TV transmission and receiving unit of the TV and the computer transmission and receiving unit of the computer for transmitting the first packet signal and the second packet signal.

2. The apparatus of claim 1, wherein said transmission line includes:

a first transmission line for transmitting the first packet signal from the TV transmission and receiving unit to the computer transmission and receiving unit; and a second transmission line for transmitting the second packet signal from the computer transmission and receiving unit to the TV transmission and receiving unit.

3. A method, comprising:

generating, in a television, control signals including at least one of a mouse signal, a keyboard signal, a microphone signal and control signals for controlling a personal computer;

encoding, in the television, the generated control signals;

generating, in the television, a packet signal by using the encoded control signals;

sending the generated packet signal to a personal computer, receiving the generated packet signal sent from the television;

decoding the received signal for input into a circuit of the personal computer; and performing the function of the personal computer according to the decoded signal.

4. The method of claim 3, wherein the generated packet signal output from the television is received along a wireless link.

5. The method of claim 3, wherein the generated packet signal output from a television circuit of the television is wirelessly transmitted to the personal computer.

6. A system, comprising:

a first interface unit in a television; and a second interface unit coupled to a personal computer, wherein the first interface unit, in the television, generates control signals including at least one of a mouse signal, a keyboard signal, a microphone signal and control signals for controlling the personal computer, the first interface unit further encoding the generated control signals in the television and generating a first packet signal in the television by using the encoded control signals, and the first interface unit sending the first packet signal from the television to the personal computer over a communications link, the first packet signal controlling a function performed by the personal computer, and the second interface unit sends a second packet signal generated in the personal computer to the television over the communications link and the second packet signal includes at least one of a monitor display signal and a sound signal to be projected and to be played through the television.

7. The system of claim 6, wherein the control signals include microphone data.

8. The system of claim 5, wherein the communications link is a wireless link.

9. A method for controlling a computer at the side of a TV (television set), comprising:

encoding control signals including at least one of a mouse signal, a keyboard signal, a microphone signal and control signals for controlling a computer, which are generated in a TV and generating a first packet signal by using the encoded control signals;

encoding computer signals including at least one of a PC monitor display signal, sound signals and control signals generated in the computer and generating a second packet signal by using the encoded computer signals;

receiving the first packet signal from the TV, transmitting the received first packet signal to the computer and receiving the second packet signal from the computer;

receiving the second packet signal from the computer, transmitting the received second packet signal to the TV and receiving the first packet signal from the TV;

decoding the received second packet signal and recovering the decoded second packet signal into the PC monitor display signal, the sound signals and the control signals of the computer; and decoding the received first packet signal and recovering the decoded first packet signal into the control signal including the mouse signal, the keyboard signal, the microphone signal and the control signals for controlling the computer.

* * * * *